US011254401B2

(12) United States Patent
White

(10) Patent No.: US 11,254,401 B2
(45) Date of Patent: Feb. 22, 2022

(54) POLE LIGHT AND BASE SYSTEM WITH TRANSFORMATION OF WATERCRAFT BATTERY VOLTAGE

(71) Applicant: Lightbulb Innovation, LLC, Lucas, TX (US)

(72) Inventor: Russell W. White, Austin, TX (US)

(73) Assignee: Lightbulb Innovation, LLC, Lucas, TX (US)

(*) Notice: Subject to any disclaimer, the term of this patent is extended or adjusted under 35 U.S.C. 154(b) by 0 days.

(21) Appl. No.: 17/195,931

(22) Filed: Mar. 9, 2021

(65) Prior Publication Data
US 2021/0284296 A1    Sep. 16, 2021

Related U.S. Application Data

(60) Provisional application No. 62/989,964, filed on Mar. 16, 2020.

(51) Int. Cl.
*B63B 45/02* (2006.01)
*F21V 23/06* (2006.01)
*H02J 7/00* (2006.01)
*F21W 107/20* (2018.01)

(52) U.S. Cl.
CPC ............ *B63B 45/02* (2013.01); *F21V 23/06* (2013.01); *H02J 7/0045* (2013.01); *B63B 2201/08* (2013.01); *F21W 2107/20* (2018.01); *H02J 2207/30* (2020.01)

(58) Field of Classification Search
CPC ......... B63B 45/00; B63B 45/02; B63B 45/04; B63B 45/06; B63B 45/08; B63B 2045/005; F21W 2107/20; F21V 23/06
See application file for complete search history.

(56) References Cited

U.S. PATENT DOCUMENTS

| | | | |
|---|---|---|---|
| 2,938,109 A | 5/1960 | Coleman | |
| 5,704,704 A | 1/1998 | Reichard et al. | |
| 6,062,713 A * | 5/2000 | Renlger | B60Q 1/26 362/477 |
| 9,989,242 B1 * | 6/2018 | Pradas | F21V 33/0004 |
| 10,787,239 B2 * | 9/2020 | Corley | H01R 33/94 |

* cited by examiner

*Primary Examiner* — Robert J May
(74) *Attorney, Agent, or Firm* — Trop, Pruner & Hu, P.C.

(57) ABSTRACT

A pole light and base system that includes a pole light base configured to be secured to a gunwale of a watercraft. In practice, the pole light base might include a pole light tube and a female Universal Serial Bus connector. The pole light tube may have electrical contacts configured to engage respective electrical contacting portions of an all around light pole if an all around light pole is inserted into the pole light tube. In some cases, the system might include the all around light pole and light. The electrical contacts of the tube might include a positive contact electrically coupled to a first wire and a negative contact electrically coupled to a second wire. The first and second wire may be designed to connect directly to a 12 Volt watercraft battery. They may also connect to a boat fuse box that is connected to a battery. Similarly, the female USB connector can be electrically connected to a printed circuit board that includes transforming components capable of transforming 12 Volt power from a watercraft battery into a lower voltage, such as 5 volt, that is made available via the female USB-A connector.

20 Claims, 9 Drawing Sheets

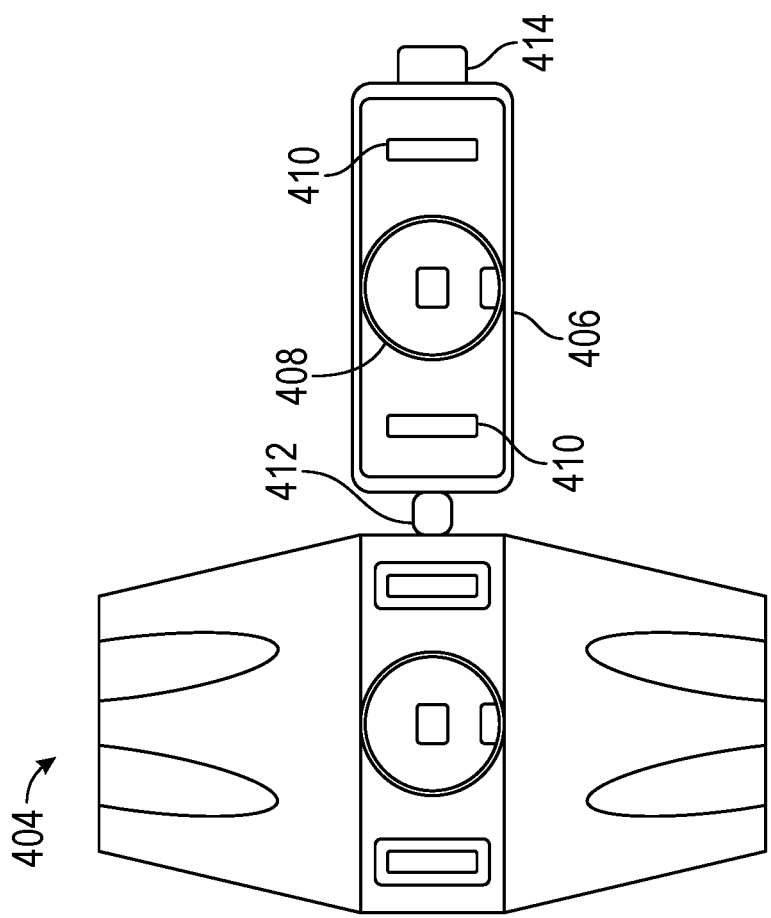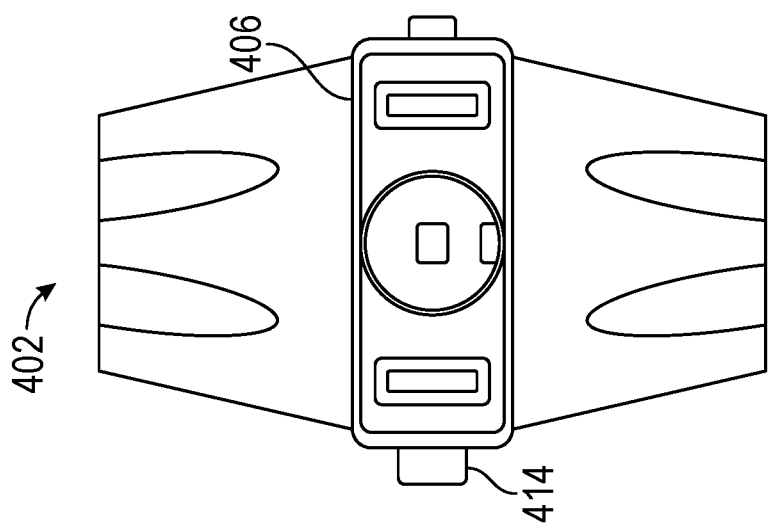
FIG. 4

POLE LIGHT AND BASE SYSTEM WITH TRANSFORMATION OF WATERCRAFT BATTERY VOLTAGE

This application claims priority to U.S. Provisional Patent Application No. 62/989,964, filed on Mar. 16, 2020, in the name of Russell W. White, entitled "A Pole Light and Base System," the disclosure of which is hereby incorporated by reference.

TECHNICAL FIELD

The following disclosure relates to lighting systems for watercraft, and more particularly to a pole light and base system.

BACKGROUND

Generally speaking, lighting systems allow for improved visibility. With regards to watercraft, the lighting system may help the operator and/or passenger of a given marine vessel to see well. The lighting system may also help other vessels to better see the given marine vessel. In many locations, a marine vessel operating at night is required to carry a light that illuminates over an arc of 360 degrees. On some waterways, the light needs to be relatively bright and visible for at least two miles. In order to comply with these requirements, many boaters choose to use a pole light. Often, the pole light is detachably mounted in a pole base or receptacle.

In practice, the pole base is mounted to an exterior surface of a boat and wired to the battery of the boat. The base generally has an opening or pocket containing electrical contacts that are designed to interact with electrical contacts on and/or near the bottom of the pole light's pole. When the pole is properly seated in the pocket, power from the boat's battery is passed from the pole base to the pole and ultimately causes a bulb or a collection of light emitting diodes to illuminate. Coleman (U.S. Pat. No. 2,938,109) and Reichard, et al. (U.S. Pat. No. 5,704,704), for example, discuss traditional pole light systems.

SUMMARY OF THE INVENTION

In one aspect, a pole light system comprises: a pole light base configured to be secured to a gunwale of a watercraft, the pole light base comprising a pole light tube and a female Universal Serial Bus type A (USB-A) connector; the pole light tube having electrical contacts configured to engage respective electrical contacting portions of an all around light pole when the all around light pole is inserted into the pole light tube, the electrical contacts including a positive contact electrically coupled to a first wire and a negative contact electrically coupled to a second wire; and the female USB-A connector electrically connected to a printed circuit board comprising transforming components configured to transform a watercraft battery voltage into a lower voltage available via the female USB-A connector.

In an example, the first wire and the second wire are coupled to a watercraft battery to provide the watercraft battery voltage. The pole light system may further include a second female USB-A connector electrically connected to the printed circuit board. The pole light tube may be configured to receive a powering system, the powering system configured to couple to the electrical contacts to provide an AC output. The pole light tube may be configured to receive a lighting system, the lighting system having a plurality of cantina lights.

In another aspect, a system comprises: a second base configured to be inserted into a first base, where the first base is configured to be secured to a surface of a watercraft and having a first opening extending to a bottom, the first opening including first electrical contacts to electrically couple to a power source of the watercraft. The second base may include: a second opening; a charging system to charge one or more electrical devices via transformation of a battery voltage; and second electrical contacts to contact the first electrical contacts. The system may concurrently charge the one or more electrical devices and power a light pole inserted in the second opening.

In an example, the second base comprises a deformable portion, the deformable portion comprising at least one USB connector electrically connected to the charging system. A cap may cover the second opening and the at least one USB connector in a first position and to expose the second opening and the at least one USB connector in a second position. In another example, the system may further include: a first cap to cover the second opening; and a second cap to cover the at least one USB connector.

In one example, the deformable portion comprises a plurality of channels to facilitate removal of water. The deformable portion comprises a foam member, in an example. The system may further comprise wires to couple the charging system to the second electrical contacts. The power source may be a battery of the watercraft. The second opening may be configured to receive a powering system, the powering system configured to couple to the second electrical contacts to provide an AC output. The second opening also may be configured to receive lighting system, the lighting system having a plurality of cantina lights.

In yet another aspect, a pole light system comprises: a pole light base configured to be secured to a surface of a marine vessel, the pole light base comprising a pole light tube and a charging system; the pole light tube having first electrical contacts configured to engage respective electrical contacting portions of a detachable pole light when the detachable pole light is inserted into the pole light tube, the first electrical contacts including a positive contact electrically coupled to a first wire and a negative contact electrically coupled to a second wire; and the charging system configured to transform a first DC voltage into a second DC voltage, the charging system comprising at least one USB connector.

In an example, the charging system is to concurrently charge at least one electrical device coupled to the at least one USB connector while power is provided to the detachable light pole. The pole light base may be a deformable portion having a plurality of channels to facilitate removal of water. The pole light system further may include at least one cap to cover the pole light tube and the at least one USB connector. The pole light base may be configured to be secured to a first base adapted to the surface of the marine vessel, where the pole light tube is insertable within a first opening of the first base, the first opening having second electrical contacts to electrically couple to a power source of the marine vessel that provides the first DC voltage.

BRIEF DESCRIPTION OF THE DRAWINGS

FIG. 4 illustrates a top view of a system incorporating teachings of the present disclosure;

DETAILED DESCRIPTION

While there may be any number of systems and situations in which a user may elect to utilize some of the teachings disclosed herein, the following detailed discussion focuses on a boating environment, and more specifically, on a stern light base for recreational watercraft. This focus does not limit the applicable scope of the teachings. It is intended to aid the reader in understanding a given application of the teachings.

As mentioned above, a boater may want to operate his or her vessel at night. In many locations, a stern light is required for such operations. Basically, a boater needs to place a pole with a light that sits atop it into a stern light base. The pole will have electrical contacts that engage contacts on the light base, and the light base will be electrically connected to one or more of the boat's battery. This connection may or may not be made through a fuse. In practice, power from the battery will pass to the light base, through the contacts to the pole, and eventually to a light sitting atop the pole. This system allows the boater to operate at night with a light illuminating over an arc of 360 degrees.

Figure 1:
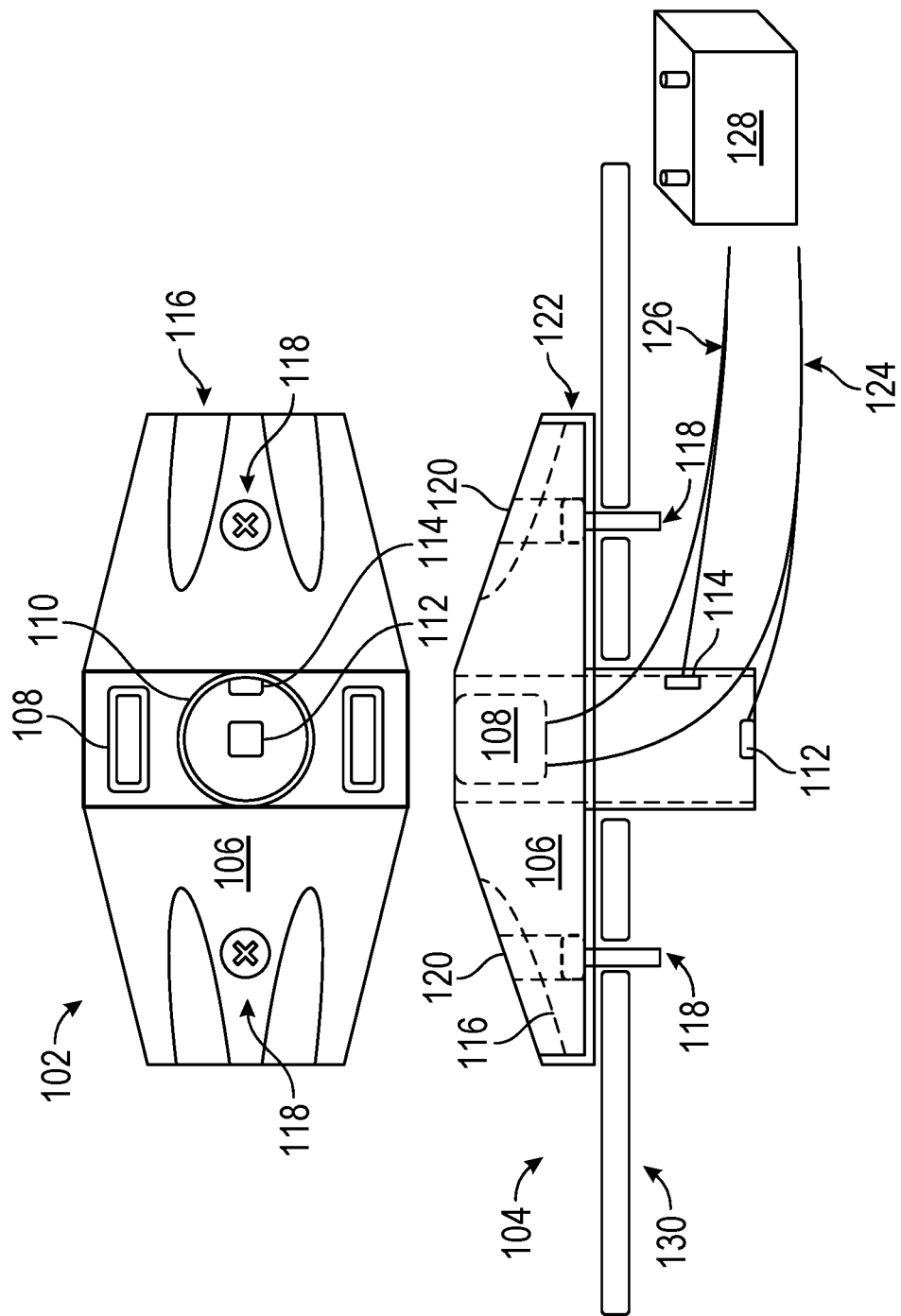
FIG. 1 illustrates a replacement pole light base that incorporates teachings of the present disclosure.

To better serve the boater, a stern light base like the one illustrated in FIG. 1 may be utilized. As mentioned above, FIG. 1 illustrates a system 102 that includes a replacement pole light base 104 that incorporates teachings of the present disclosure. As shown, base 104 includes a foam section 106. While depicted as foam, section 106 could be formed of other materials. In some embodiments, foam section 106 helps to protect other components of base 104 from impacts with various boating equipment and/or people. Additionally, foam section 106 may protect boaters from inadvertently impacting hard and/or potentially painful edges of base 104.

Also included as a component of base 104 are charger elements 108. As shown, chargers 108 could be Universal Serial Bus (USB) charging systems capable of transforming 12 Volt power from a boat's battery to a 5 Volt charging power supply compliant, for example, with USB 1.0, 2.0, 3.0, and 3.x. Base 104 may also include a light pole opening 110 within which a boater may insert a pole light. Within opening 110 may be located contacts 112 and 114. Contacts 112 and 114 may be connected to cabling, such as insulated 16 AWG wires 124 and 126 that can be connected to a boat battery 128 and/or a fuse box. In some case, the cables and contacts may be capable of handling at least 10 amps. In some cases, they may be capable of handling 15 amps. Other amperage handling capabilities may be chosen depending on design goals. As shown, wires 124 and 126 may also include splits such that wires 124 and 126 also provide power to chargers 108.

As depicted, foam 106 includes channels 116, which may facilitate the removal of water from areas close to opening 110 and chargers 108. Foam 106 may also include counter sunk openings 120 that facilitate the use of screws 118 to secure base 104 to an exterior surface of a marine vessel. As shown, base 104 includes a rigid structure 122 that screws 118 may interact with when base 104 is secured to a gunwale 130 at the stern of a boat. In practice, a user may utilize chargers 108 to charge a phone or other electronic device while also being able to insert an all around stern light on a light pole into opening 110.

Figure 2:
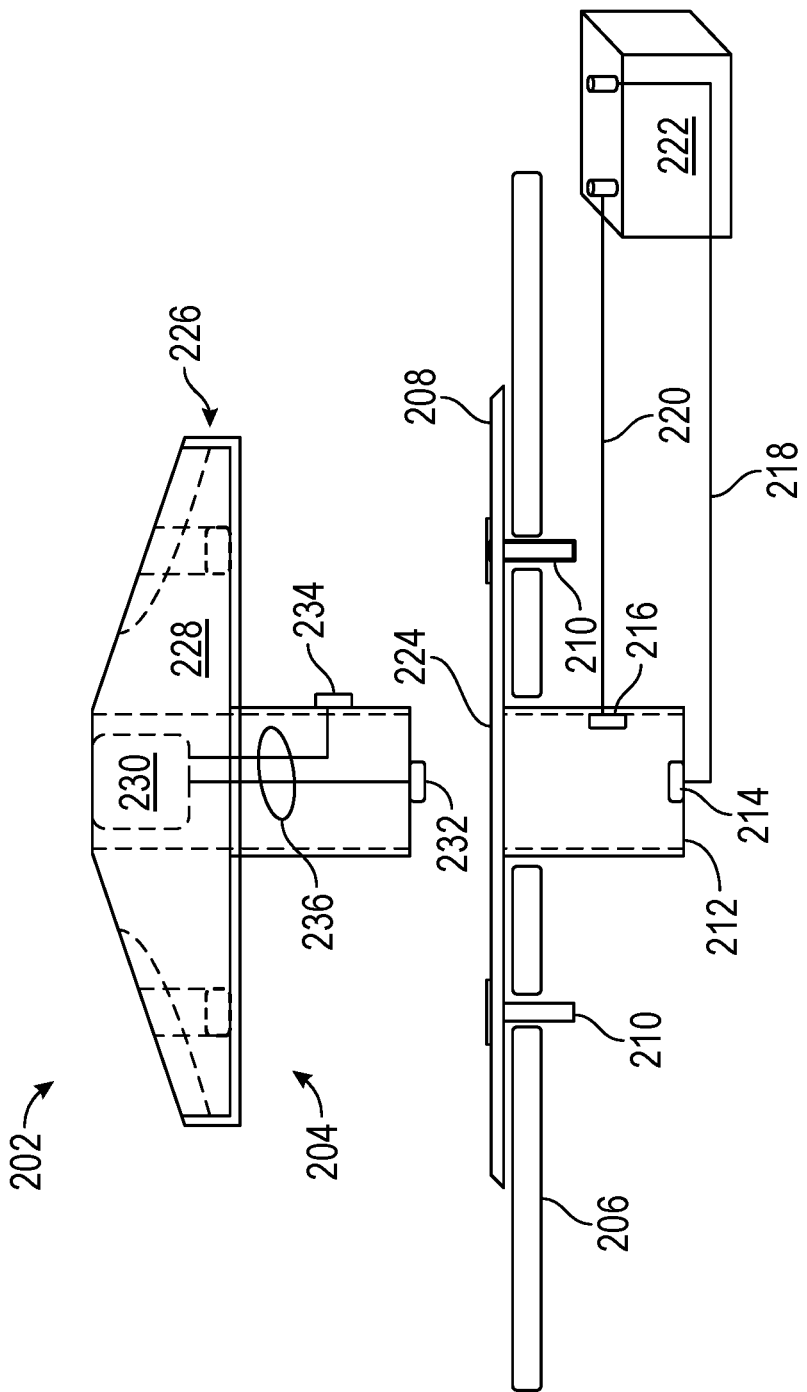
FIG. 2 illustrates an insertable pole light base that incorporates teachings of the present disclosure.

FIG. 2 illustrates a system 202 that includes an insertable pole light base 204 that incorporates teachings of the present disclosure. As shown, an existing light pole base 208 is connected with screws 210 to a portion of a gunwale 206. Existing light pole base 208 includes an opening 224 having a bottom 212. In practice, a light pole may be inserted into opening 224 and pressed down to bottom 212. At bottom 212 and along an interior side wall of opening 224 are contacts 214 and 216. These contacts are connected to cables 218 and 220, respectively, and cables 218 and 20 are connected to battery 222.

In practice, insertable base 204 may be secured within opening 224 such that contact 232 engages contact 214 and contact 234 engages contact 216. As shown, contacts 232 and 234 may also be configured such that the contacts of a pole light inserted within an opening of base 204 will engage with contacts 232 and 234. As such, a light pole inserted into base 204 after base 204 has been secured with opening 224 will still be capable of receiving power from battery 222.

In addition, wiring 236 will also allow for the transmission of power to charger 230, which may include a female USB connector and a transformer capable of converting 12-volt power to 5-volt power. In the depicted embodiment, base 204 includes a rigid mounting surface 226 and a foam padding 228. As mentioned above, base 204 may be secured to base 208. This securing could be, for example, a removable securing or a permanent securing. A removable securing may include a threaded securing, a friction fit securing, etc. A permanent securing may include, for example, a glued securing.

Figure 3:
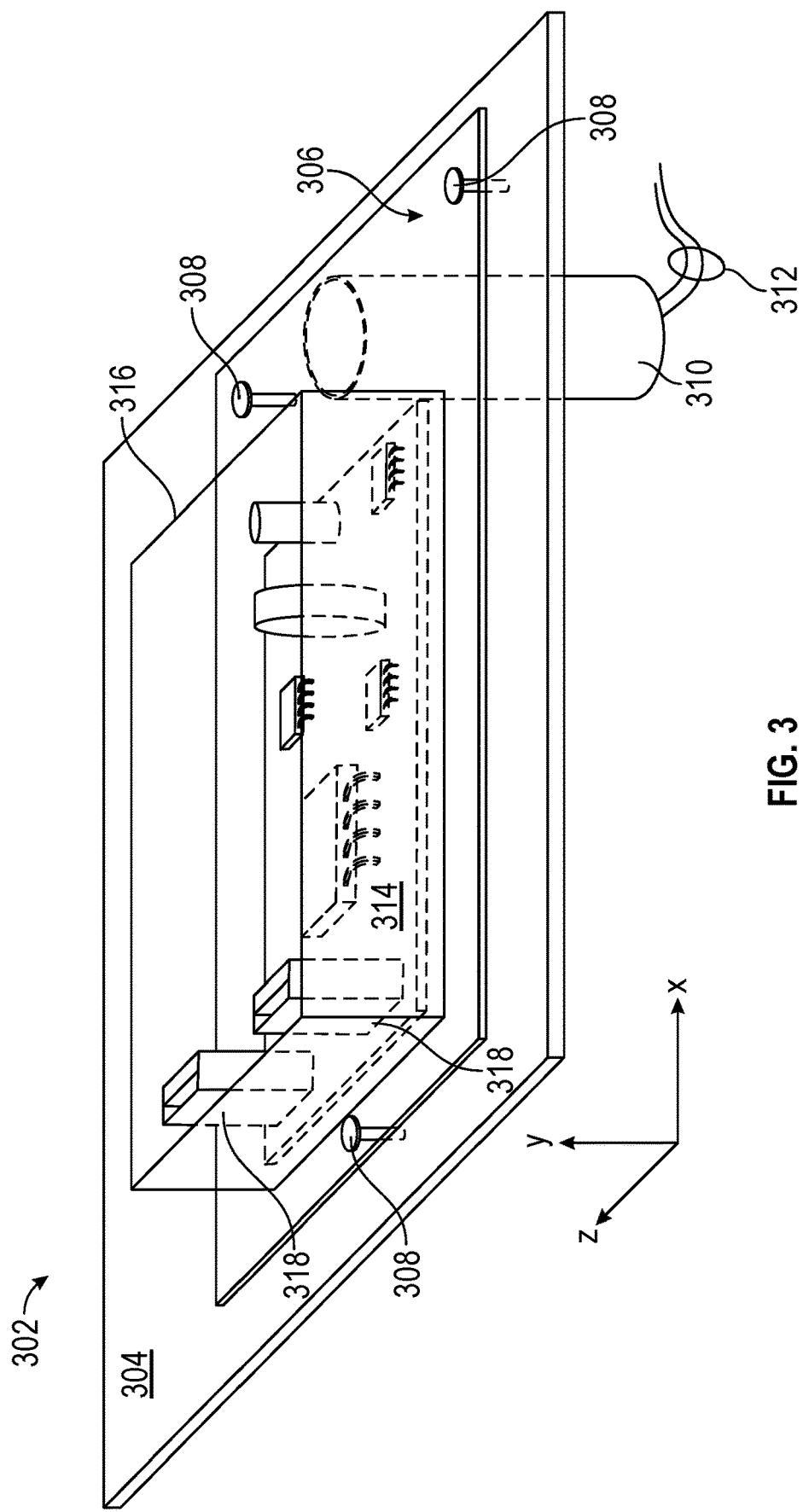
FIG. 3 illustrates an example system including a printed circuit board incorporating teachings of the present disclosure.

As mentioned above, FIG. 3 illustrates a system 302. As shown, a rigid securing platform 306 is connected to a gunwale portion 304 using screws 308. As depicted, an example printed circuit board 314 incorporating teachings of the present disclosure includes a coating 316. As shown, coating 316 may be, for example, a silicon gel, encapsulate, or conformal coating. As shown, board 314 defines an X-Z plane, and two USB connectors 318 extend from board 314 into a Y direction. As shown, platform 306 also includes a circular opening within which a pole light may be inserted. Extending below gunwale portion 304 is pole-holding tube 310, which may have contacts for engagement with the contacts of a pole light pole. Connected to the contacts of holding tube 310 may be wires 312, which may ultimately connect to a boat fuse box or boat battery. The power transmitted along wires 312 may connect to contacts within tube 310 as well as powering board 314, which may include a DC/DC converter, a battery power management chip, a reverse protection diode, etc. In an embodiment, board 314 may include transforming components configured transform a watercraft battery voltage into a lower voltage available e.g., via a USB connector such as a female USB-A connector.

FIG. 4 illustrates a top view of a system incorporating teachings of the present disclosure. As depicted, system 402 depicts a closed system and system 404 depicts an open system. As shown with system 404, an openable cap 406 is connected a light pole base. Cap 406 includes a round sealing component sized and configured to close off the pole opening of the light pole base when cap 406 is hinged into a closed depiction, as seen in system 404. Hinging element 412, which may be a bendable piece of rubber, silicon, plastic, or some other appropriate material, may allow for the repeated opening and closing of cap 406. Also shown on cap 406 are two USB sealing components 410, which may protect the USB ports of the light pole base when cap 406 is in a closed position. Additionally, cap 406 includes a lifting tab 414 that may facilitate the opening of cap 406 when it is in the closed position of system 402. In practice, cap 406 may be a single component formed of rubber, silicon, plastic, etc., and may be formed such that seals 408 and 410 are visible as raised portions of cap 406 that fit snugly into the light pole opening and the USB ports of the base when cap 406 is in the closed position. These sealing elements may help to keep water and debris from falling into openings of the base. As depicted, cap 406 opens and closes via hinging element 412, which moves around an axis that is parallel to the longest axis of the base.

Figure 5:
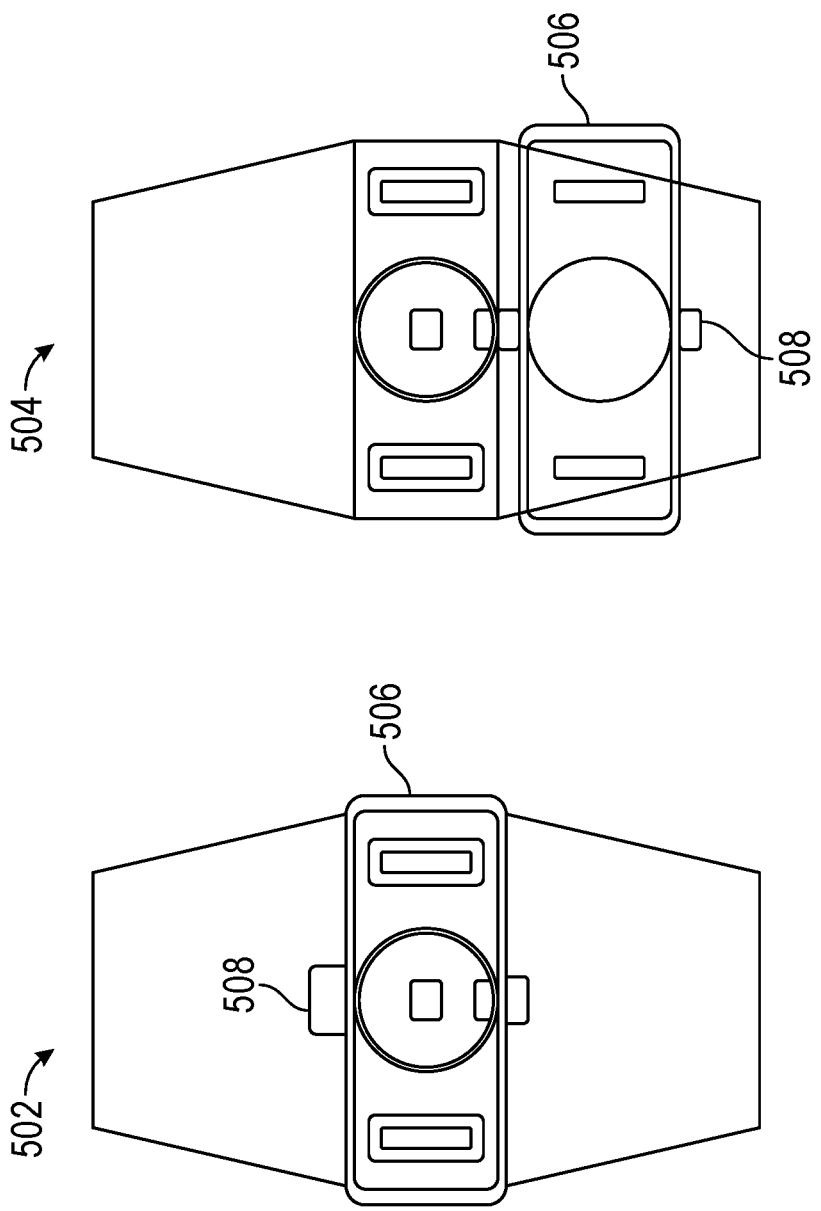
FIG. 5 illustrates a top view of a system incorporating teachings of the present disclosure.

FIG. 5 illustrates a top view of a system incorporating teachings of the present disclosure. As shown, the hinging element moves around an axis that is perpendicular to the longest axis of the base. Similar to the system of FIG. 4, the illustrations in FIG. 5 show a closed cap image 502 and an open cap image 504. The cap 506 may be formed of any appropriate material. For example, it may be made from a soft silicon and/or rubber. In addition to a hinging element, the cap may include a lifting tab 508. As depicted, cap 506 is a single component that opens and closes all openings of the base at the same time. In practice a designer may choose to use a single component, two components, three components, etc. For example, a designer may want a boater to have the option of independently opening up the light pole opening, only one of the USB ports, and or both of the USB openings. As such, a system like the one depicted in FIG. 5 could be altered, for example, to have three capping elements—one for each of the USB ports and one for the light pole opening. In such a design, each element may have a sealing component designed for the respective opening, an individual lifting tab, and an individual hinge.

Figure 6:
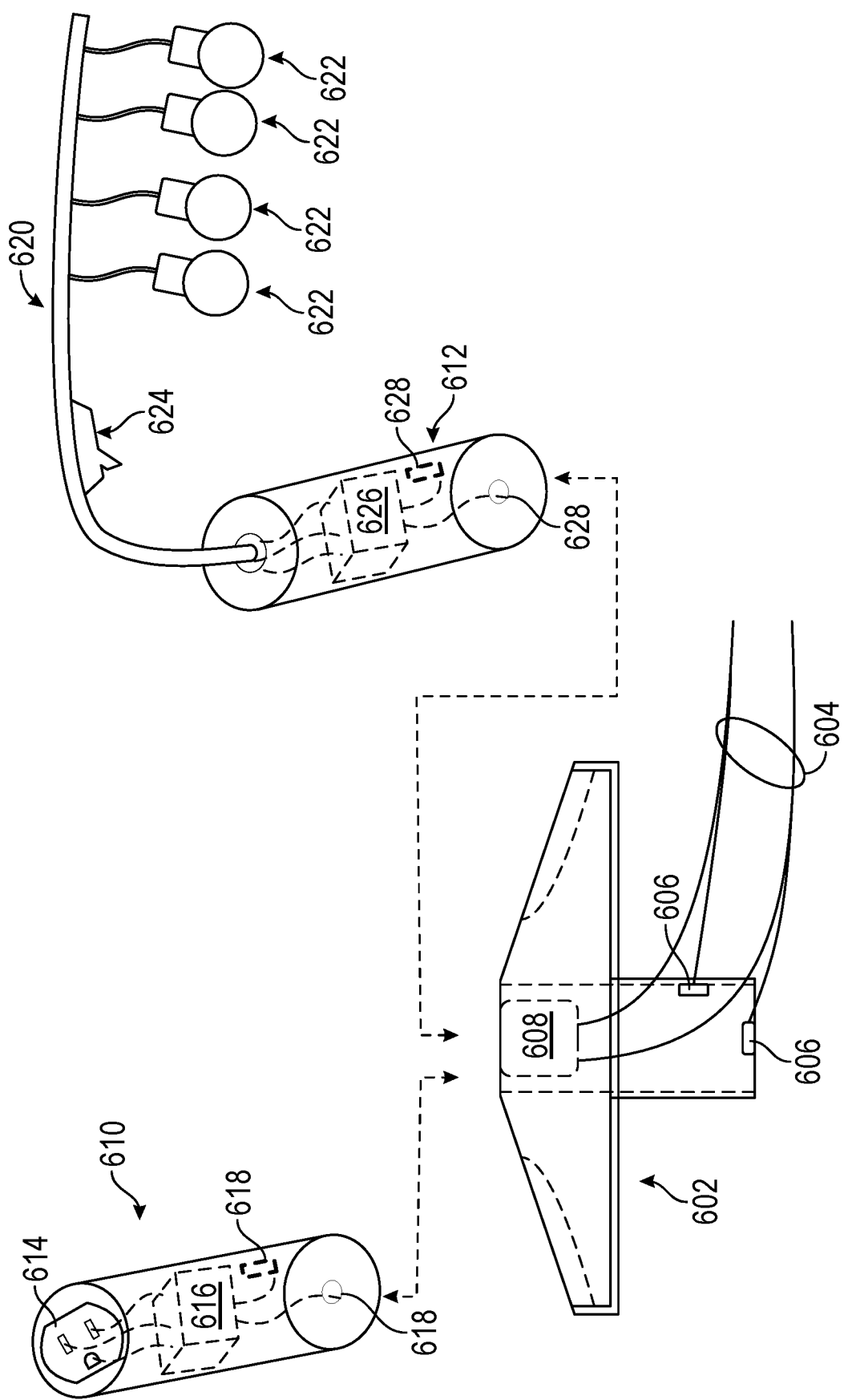
FIG. 6 illustrates a lighting and powering system that incorporates teachings of the present disclosure.

As mentioned above, FIG. 6 illustrates a lighting system 612 and a powering system 614 that incorporate teachings of the present disclosure. As shown, light pole base 602 may include wires 604 connecting light pole contacts 606 and charging port system 608 to a boat battery and/or fuse box. As shown, contacts 618 of powering system 614 may engage light pole contacts 606 when powering system 614 is placed with the light pole opening of base 602. Depending on designer focus, wires 604 may be sized to ensure desired amperages, for example 10 to 15 amps, can be safely passed to base 602 and contacts 606. The 12-volt power and desired amperages may then be passed along to powering system 614 via the engagement of contacts 606 and 618. Powering system 614 may include a 12-volt DC to 120 volt AC inverter 616 that is electrically connected to contacts 618. In practice, the 120-volt AC output may be available via one or more plugs like plug 614. As depicted, powering system 614 fits within the light pole opening of light pole base 602. In practice, a designer may choose an inverter that is larger than the light pole opening. In such an embodiment, powering system 614 may include a cylindrical extension configured for placement within the light pole opening and an upper portion that remains outside of the light pole opening and includes one or more components of the inverter and/or plugs.

Similarly, lighting system 612 includes contacts 628. As shown, contacts 628 are configured to engage contacts 606 when at least a portion of lighting system 612 is pressed into the light pole opening of base 602. In some embodiments, the power available via this contacting may be transformed by transforming system 626 from 12 volts into 42 volts and/or some other desired voltage. The power may then be transmitted via cabling 620 to cantina lights 622. A designer may space the lights at a desired interval such as 24 inches apart and provide mounts along cabling 620. In practice, this may allow a boater to string cantina lights along a Bimini top (for example) and enjoy a new kind of lighting for a recreational watercraft. Lighting system 612 may also include a switch 624 to facilitate turning lights 622 on and off. In some embodiments, lighting system 612 (as well as powering system 614) may include a secondary light pole opening that allows a boater to insert lighting system 612 into base 602 while also providing a secondary light pole opening in case the boater wants to simultaneously use an all around light on his or her light pole and the cantina lights of system 612.

Figure 7:
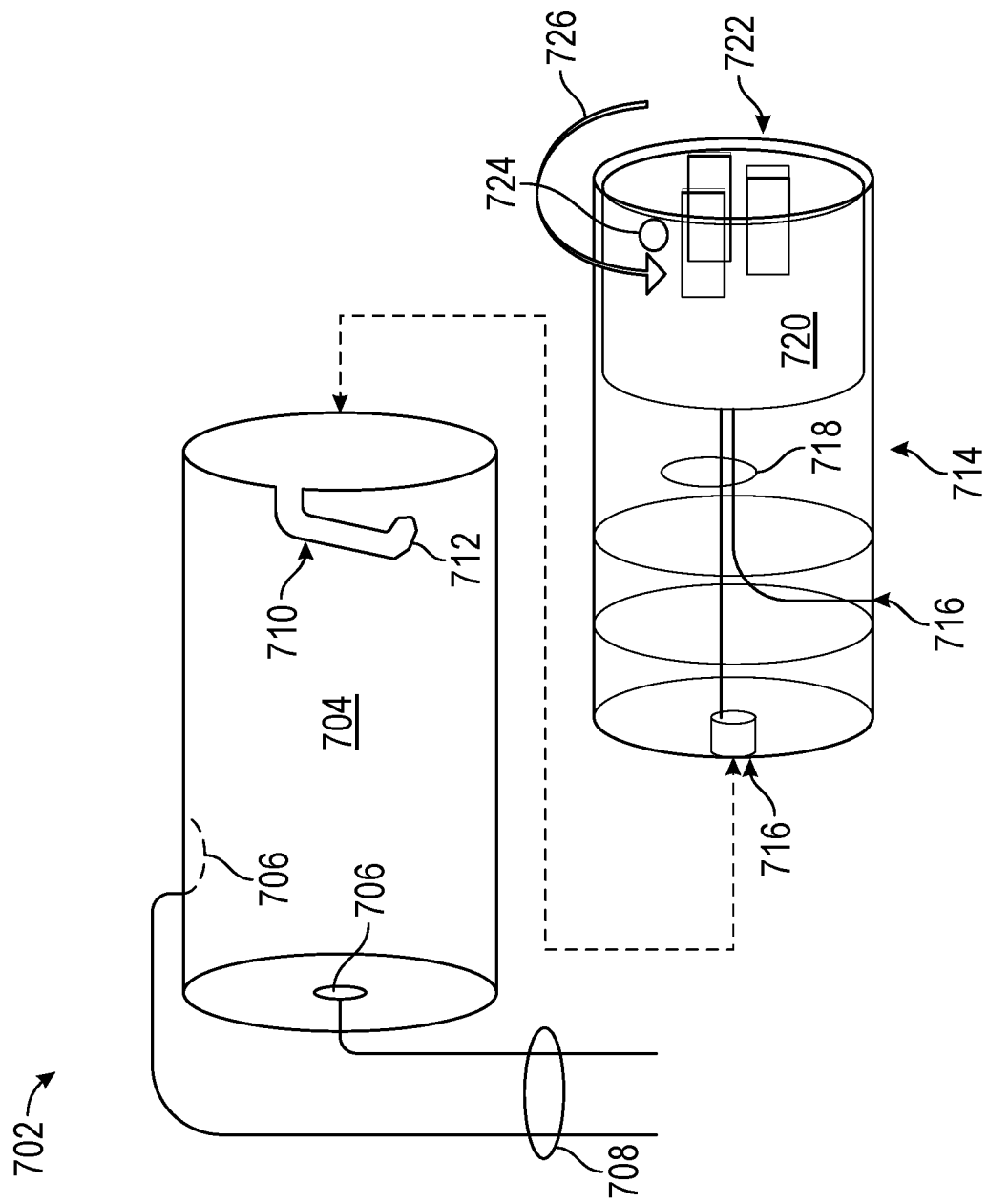
FIG. 7 illustrates a powering system that incorporates teachings of the present disclosure.

FIG. 7 illustrates a powering system 702 that incorporates teachings of the present disclosure. As shown, power inverter 714 is configured to be removably coupled with light pole tube 704, which includes contacting portions 706 that are conductively coupled to wires 708. A designer will recognize that wires 708 can be connected directly to a boat battery and/or a fuse that is connected to a battery. Tube 704 also includes a channel 710 with a locking shoulder 712. When power inverter 714 is inserted within tube 704, contacting elements 716 can engage contacts 706. Moreover, locking nodule 724 may be routed into channel 710. When inverter 714 is rotated as depicted by arrow 726, nodule 724 may travel along channel 710 until locked into place behind locking shoulder 712. In some cases, the contacting element 716 located on the bottom of inverter 714 may be spring loaded in a manner that allows nodule 724 to fall behind shoulder 712 while also ensuring that the contacting element 716 located on the bottom of inverter 714 maintains contact with its respective contact 706. In practice, power communicated across the contacts may travel through wires 718 to inverting circuitry 720 and ultimately made available as 120 volt AC power via plug 722.

Figure 8:
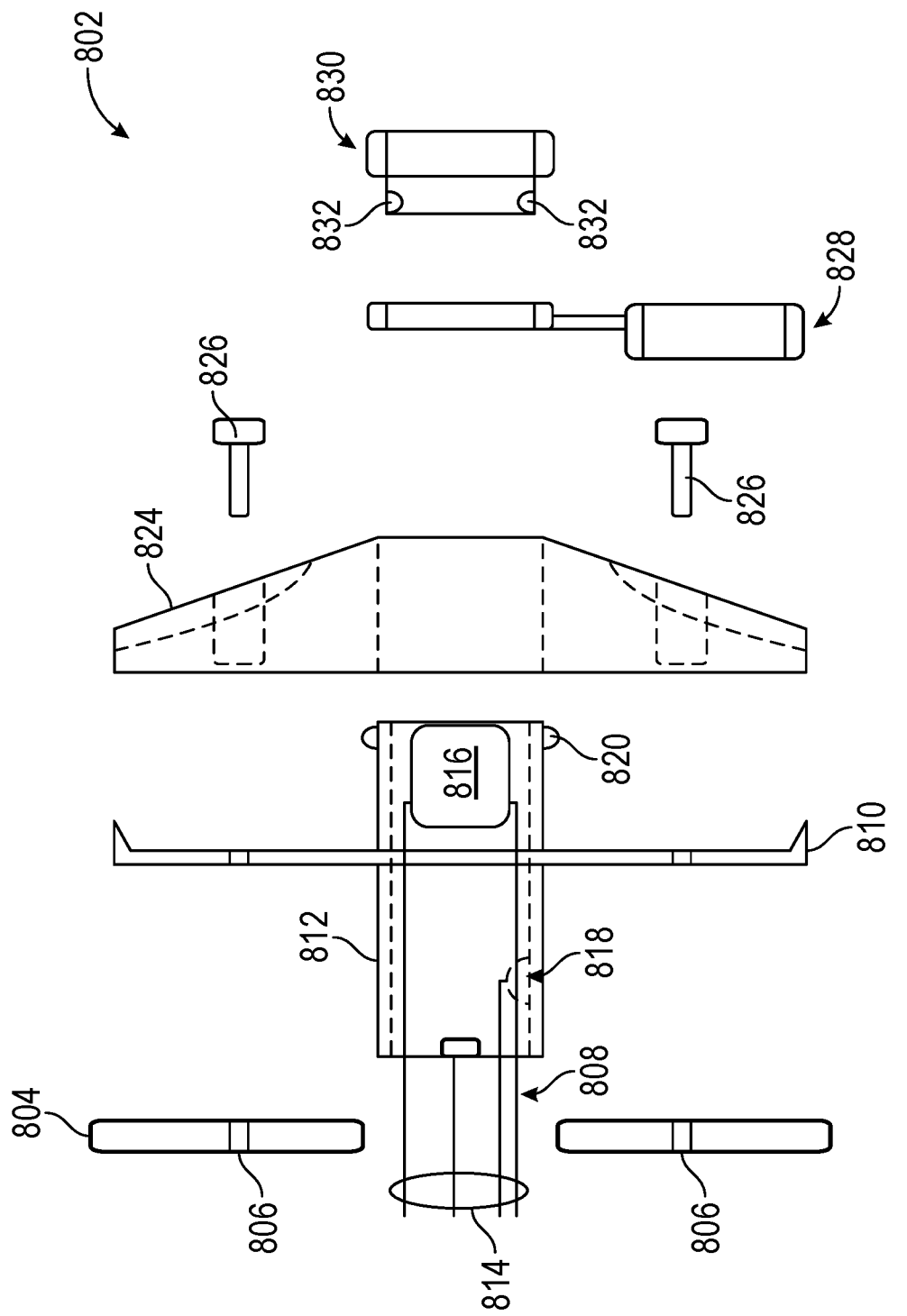
FIG. 8 illustrates an exploded view of a pole base system that incorporates teachings of the present disclosure.

FIG. 8 illustrates an exploded view of a pole base system 802 that incorporates teachings of the present disclosure. As shown, a portion of gunwale 804 may have mounting holes 806 and a light pole tube hole 808 formed through the gunwale. An extruded plastic, metal, and/or other appropriate material form mounting base 810 may include a light pole tube 812 and battery connection wires 814 that can all be routed into tube hole 808. Base 810 may also include a USB-A female port and associated circuitry 816 which may be electrically connected to wires 814. Similarly, contacts 818 may also be included with base 810 and electrically connected to wires 814. As shown, a light pole tube portion may also extend above a mounting layer of base 810. As shown, the bottom of mounting layer of base 810 would rest on a top surface of gunwale 804 when base 810 is secured to gunwale 804. Included near the top of the light pole tube portion extending above the mounting layer as a locking shoulder 820 that may extend all the way around or only partially around the top portion of light pole tube 812.

As shown, foam 824 is formed into a tapering shape with a high point near the center. Foam 824 is sized and shaped to fit around the top portion of light pole tube 812 and to rest on a top surface of base 810's mounting layer. Screws 826 can be inserted into a countersunk portion of foam 824, through holes formed into the mounting layer of base 810 and into gunwale 804 at locations 806. Depicted in an open position, cap 828 includes a ring portion that may be placed around the top portion of tube 812. Once cap 828 is properly located, locking cap 830 may be snapped into place to secure foam 824 and cap 828 in location. As shown, locking cap 830 includes locking nodules 832, which may interact with locking shoulder 820 in a manner that secures the components in place.

As mentioned above, FIG. 9 illustrates a system 902 that may exist above a light pole base system in accordance with teachings of the present disclosure. As shown, inverter 904 may include a light pole extension 906 configured to interact with an existing light pole base system, which may be a traditional system or a novel system like the one depicted in FIG. 1. In practice, extension 906 may include a positive connector 908 and a negative connector 910. These connectors may engage electrical contacts on a light pole base to electrically connect inverter 904 to a battery and/or fuse box of a boat. The at or near 12+/−3 Volt DC power provided from the boat power source may be communicated, ultimately, through wires 912 to contacts 914 and through wires 916 to inverter components 918.

In practice, contacts 914 may reside within new light pole base opening 928. As such, when inverter 904 is placed within an existing light pole base, an all around light pole may be placed within new opening 928 and operate as if it had been placed in the existing light pole base.

Similarly, inverter 918 may receive power via contacts 908 and 910, wires 912, and wires 916. The power provided from a boat power source may be approximately 12 Volts DC. Inverter 918 may chop the 12 volt DC power into a square wave AC power, Inverter 918 may then transform the power from approximately 12 Volts AC to approximately 5+/−2 Volts AC, 42+/−5 Volts AC, 110+/−10 Volts AC, etc. In some cases, inverter 918 may rectify the output voltage to create a DC output. For example, with a 5 Volt output, the 5 Volts may be DC. Similarly, the output may continue to be AC output. For example, a 110 Volt output may be AC.

Depending upon design concerns, a designer may choose to have one, two, three, or more components like inverter components 918. Each of the components could, for example, be designed for outputting different output voltages. As depicted, the output power of inverter components 918 is made available via cabling 920. As shown, the terminal end of cabling 920 could be an outlet 922, a USB charger 924, and/or a cantina light string 926. In some embodiments, cabling 920 could have a receptacle at its terminal end that allows for the connection of one or more of outlet 922, USB charger 924, and/or a cantina light string 926.

Figure 9:
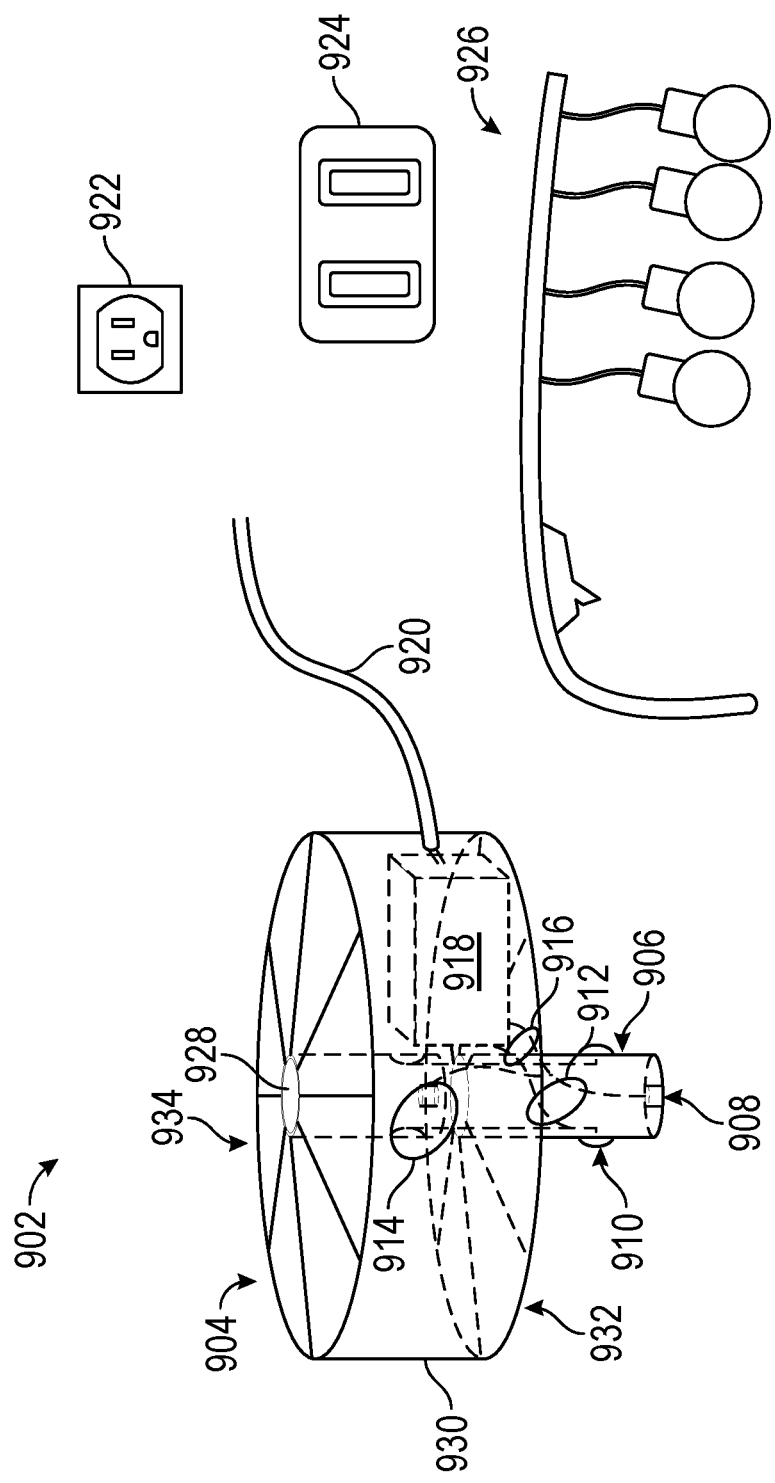
FIG. 9 illustrates an above-light pole base system incorporating teachings of the present disclosure.

As shown in FIG. 9, housing component 930 may at least partially form an enclosure within which components like inverter 918 are secured. Similarly, inverter 904 may include a top surface 934. The top surface could be convex in shape and include a foam component to help protect against a user engage hard surfaces and edges. Inverter 904 may also include a bottom surface 932. Surface 932 could be flat to facilitate an easy resting on a gunwale surface. Surface 932 could also be generally concave. For example, surface 932 could be formed into a generally concave shape that nests comfortably on top of a light pole base like the one depicted in FIG. 1.

To be clear, a designer may choose to create a system that uses all or some of the above teachings in various configurations. The above description teaches several aspects in a complete and yet succinct way. A designer will recognize that he or she can take a teaching, for example, from FIG. 1 and combine it with a teaching from, for example, FIG. 6. A system incorporating teachings of the present disclosure may replace, add, or delete many of the above-described features and components without departing from the scope of the disclosure. One skilled in the art will recognize that the many of the above-described components could be combined or broken out into other combinations.

Although the present invention has been described in detail, it should be understood that various changes, substitutions and alterations to the devices, methods, and other aspects and techniques of the present invention can be made without departing from the spirit and scope of the invention as defined by the appended claims.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A pole light system comprising:
   a pole light base configured to be secured to a gunwale of a watercraft, the pole light base comprising a pole light tube and a female Universal Serial Bus type A (USB-A) connector;
   the pole light tube having electrical contacts configured to engage respective electrical contacting portions of an all around light pole when the all around light pole is inserted into the pole light tube, the electrical contacts including a positive contact electrically coupled to a first wire and a negative contact electrically coupled to a second wire; and
   the female USB-A connector electrically connected to a printed circuit board comprising transforming components configured to transform a watercraft battery voltage into a lower voltage available via the female USB-A connector.

2. The pole light system of claim 1, wherein the first wire and the second wire are coupled to a watercraft battery to provide the watercraft battery voltage.

3. The pole light system of claim 1, further comprising a second female USB-A connector electrically connected to the printed circuit board.

4. The pole light system of claim 1, wherein the pole light tube is configured to receive a powering system, the powering system configured to couple to the electrical contacts to provide an AC output.

5. The pole light system of claim 1, wherein the pole light tube is configured to receive a lighting system, the lighting system having a plurality of cantina lights.

6. A system comprising:
   a second base configured to be inserted into a first base, wherein the first base is configured to be secured to a surface of a watercraft and having a first opening extending to a bottom, the first opening including first electrical contacts to electrically couple to a power source of the watercraft;
   wherein the second base comprises:
      a second opening;

a charging system to charge one or more electrical devices via transformation of a battery voltage; and
second electrical contacts to contact the first electrical contacts; and
wherein the system is to concurrently charge the one or more electrical devices and power a light pole inserted in the second opening.

7. The system of claim 6, wherein the second base comprises a deformable portion, the deformable portion comprising at least one Universal Serial Bus (USB) connector electrically connected to the charging system.

8. The system of claim 7, further comprising a cap to cover the second opening and the at least one USB connector in a first position and to expose the second opening and the at least one USB connector in a second position.

9. The system of claim 7, further comprising:
a first cap to cover the second opening; and
a second cap to cover the at least one USB connector.

10. The system of claim 7, wherein the deformable portion comprises a plurality of channels to facilitate removal of water.

11. The system of claim 7, wherein the deformable portion comprises a foam member.

12. The system of claim 6, further comprising wires to couple the charging system to the second electrical contacts.

13. The system of claim 6, wherein the power source comprises a battery of the watercraft.

14. The system of claim 6, wherein the second opening is configured to receive a powering system, the powering system configured to couple to the second electrical contacts to provide an AC output.

15. The system of claim 6, wherein the second opening is configured to receive a lighting system, the lighting system having a plurality of cantina lights.

16. A pole light system comprising:
a pole light base configured to be secured to a surface of a marine vessel, the pole light base comprising a pole light tube and a charging system;
the pole light tube having first electrical contacts configured to engage respective electrical contacting portions of a detachable pole light when the detachable pole light is inserted into the pole light tube, the first electrical contacts including a positive contact electrically coupled to a first wire and a negative contact electrically coupled to a second wire; and
the charging system configured to transform a first DC voltage into a second DC voltage, the charging system comprising at least one Universal Serial Bus (USB) connector.

17. The pole light system of claim 16, wherein the charging system is to concurrently charge at least one electrical device coupled to the at least one USB connector while power is provided to the detachable light pole.

18. The pole light system of claim 16, wherein the pole light base comprises a deformable portion having a plurality of channels to facilitate removal of water.

19. The pole light system of claim 18, further comprising at least one cap to cover the pole light tube and the at least one USB connector.

20. The pole light system of claim 16, wherein the pole light base is configured to be secured to a first base adapted to the surface of the marine vessel, wherein the pole light tube is insertable within a first opening of the first base, the first opening having second electrical contacts to electrically couple to a power source of the marine vessel that provides the first DC voltage.

\* \* \* \* \*